United States Patent [19]
DeBoo et al.

[11] 3,762,693
[45] Oct. 2, 1973

[54] METHODS OF AND APPARATUS FOR ADVANCING AND WORKING THERMOPLASTIC MATERIALS

[75] Inventors: Robert Victor DeBoo, Chicago, Ill.; Charles Bean Heard, Jr., Lawrenceville, Ga.

[73] Assignee: Western Electric Company, Incorporated, New York, N.Y.

[22] Filed: Apr. 13, 1971

[21] Appl. No.: 133,575

[52] U.S. Cl. .............................................. 259/191
[51] Int. Cl. ............................ B29b 1/04, B29b 1/06
[58] Field of Search ................... 259/9, 10, 97, 191, 259/192, 193, DIG. 39; 416/176, 177; 425/202, 204, 208, 209

[56] References Cited
UNITED STATES PATENTS

| 2,838,794 | 6/1958 | Munger et al. ...................... 259/191 |
| 3,497,582 | 2/1970 | Pettersson............................. 264/98 |
| 3,115,675 | 12/1963 | Tedder................................. 259/191 |
| 3,486,193 | 12/1969 | Gwinn et al. .................... 425/207 X |
| 3,487,503 | 1/1970 | Barr et al............................ 425/208 |
| 3,115,674 | 12/1963 | Schrenk et al...................... 259/191 |
| 3,160,916 | 12/1964 | Blakey, Jr. .......................... 259/193 |
| 2,581,031 | 1/1952 | Kuzik.................................. 259/191 |
| 2,802,238 | 8/1957 | Colombo ............................. 259/192 |

Primary Examiner—Harvey C. Hornsby
Assistant Examiner—Alan I. Cantor
Attorney—W. M. Kain, J. B. Hoofnagle, Jr., R. P. Miller and A. C. Schwarz, Jr.

[57] ABSTRACT

An extruder for thermoplastic material has a screw of a compression relief design for advancing and working the thermoplastic material to produce an extrudate at a more uniform temperature and with a more thorough mixing of thermoplastic materials than has been achieved in the past. A metering section of the screw is provided with pins for homogenizing the thermoplastic material with all of the pins in any one portion of the screw being arranged in a plane perpendicular to the axis of rotation of the extruder screw and directed radially outward from the axis of rotation. A helical flight formed on the extruder screw is uninterrupted in at least the metering portion of the screw.

41 Claims, 7 Drawing Figures

PATENTED OCT 2 1973 3,762,693

INVENTORS
R.V. DeBOO
C.B. HEARD JR.

BY E. W. Somers

ATTORNEY

PATENTED OCT 2 1973 3,762,693

METHODS OF AND APPARATUS FOR ADVANCING AND WORKING THERMOPLASTIC MATERIALS

BACKGROUND OF THE INVENTION

1. Field of the Invention

This invention relates to methods of and apparatus for advancing and working thermoplastic materials, and more particularly to methods of and apparatus for advancing thermoplastic materials successively through feed, compression, relief, and metering zones with facilities being provided in the metering zone without interrupting the helical flight of the extruder screw for obtaining a high degree of thermal uniformity by an improved mixing of the thermoplastic materials.

2. Description of the Prior Art

In the extrusion art, and especially in the extrusion of thermoplastic materials for insulating conductors for communications needs, there is an increasing demand for equipment of higher output rates. The output rates for extrudates covering conductors, which have somewhat thin cross section, are governed somewhat by the maximum rate at which extrusion can be performed without introducing defects in the products due to a lack of uniform temperature. For example, an extruder for spinning yarn ends is operated beyond a practical rate thereof when the filaments passing therefrom are susceptible to breakage during processing or exhibit an unacceptable variation in denier. When the extrudate is a sheet, film variations in the thickness of the film are indicative of an improper rate of extrusion. Generally, the lack of temperature uniformity which manifests itself by defects such as nonuniform dimensions or reduced strength characteristics evinces a failure to achieve a thorough mixing of the thermoplastic material or materials within the extruder.

For experimental purposes, a mixture of pellets of a clear thermoplastic material of a polyethylene or polyvinylchloride base together with a very small percent, e.g., 1 per cent, of color concentrate pellets may be fed into a barrel of an extruder. The small amount of color concentrate mixes with the clear compound material when melting occurs so that the melt regions become colored and are easily distinguishable from the unmelted material. Once melting has begun, three distinct regions are noted in a cross section of a channel formed by a helical flight on an extruder screw. These are (1) the unmelted plastic or solid bed, (2) a thin melt film between the solid bed and the barrel, and (3) a melt pool where melted material collects. The percentage of unmelted plastic can be evaluated as a function of position in the extruder.

The thermoplastic material begins to melt along the interface with the inner surface of the barrel. Then, as the flight of the extruder screw advances, the flight wipes off the melt and forms a melt pool on the upstream side of each section of the channel formed by the turns of the flight. Some of the solid materials become tacky but may resist mixing and being transferred into a molten state thereby detracting from the homogeneity of the mix.

It has been found that better mixing and temperature distribution are possible through the use of relatively expensive extruders of increased barrel length to diameter ratios. A discussion of several available extruder screw designs is given in a paper, "An Operating Evaluation of Various 8 Extruder Screws Using an Infra-Red Thermometer," by R. V. DeBoo and W. B. Beck, prepared for the 16th Annular Symposium on Wire and Cable, Nov. 29, and 30 and Dec. 1, 1967.

In one screw design, commonly referred to as an immediate compression design, the root diameter of the screw increases uniformly for approximately fourteen turns along the axis of the screw followed by a metering section of approximately six turns. The depth of the compression section at the small diameter end thereof is approximately 859 mils whereas the depth along the metering section which has a uniform diameter is approximately 172 mils.

In another prior art design screw, commonly referred to as a conventional metering screw, an initial section thereof has a constant root diameter for approximately eight turns followed by a uniformly increasing root diameter section for six turns followed by a six-turn metering section. In this conventional metering screw, the depth of the feed section is approximately 688 mils and the depth of the metering section approximately 172 mils. The conventional metering screw has a slight advantage at higher revolutions per minute since the presence of the feed section insures an adequate supply of resin while at the same time providing additional time for the resin to pick up barrel heat. This minimizes subjecting the resin prematurely to compressive shear forces. Considering the limiting depth of the metering zones, which amount to approximately thirty per cent of the total screw length, the output for these screws has been regarded as acceptable.

Heat is usually applied from an external source to the extruder barrel in the compression section to raise the temperature of the material. In the metering section, the temperature of the material is increased over that of the barrel because of the energy that has been imparted to the material and hence, in that section, the barrel acts as a heat sink. As the successive portions of the material are advanced into the metering section, the materials have been generally thoroughly mixed. In the metering section, heat is distributed throughout the material so that the material is homogenized with respect to temperature, i.e., thermal uniformity.

A still further prior art screw design commonly referred to as a compression relief design is characterized in having a high output of extrudate at a low temperature which is variable. The compression relief design has a feed section of six turns with a depth of 750 mils, a compression section of six turns with a minimum depth of 150 mils, a compression relief section of one-half turn with a maximum depth of 250 mils and a metering section of 7½ turns with a constant depth of 250 mils. The compression relief design screw with its relatively deep metering section is significantly better in performance in terms of greater output and has better temperature control than the two priorly described screws.

The compression relief design screw is the genus screw design, whereas the compression screw is a species thereof with a compression relief section of zero length. The compression screw design is somewhat disadvantageous since it is difficult to manipulate independently the three sections or the metering section without affecting the others. However, with the compression relief screw design, the metering section can be adjusted and the compression relief section designed to join the metering section to the compression section.

A still further prior art screw design is commonly referred to as a slotted ring screw design which includes a feed section of four turns for a constant depth of 675 mils followed by a compression section of four turns with a minimum depth of 270 mils and a metering section of 12 turns with a constant depth of 270 mils. The slotted ring screw design is characterized by a generally high output with good mixing and a high temperature, the temperature being constant. Additionally, the slotted ring screw design has a broken flight to permit mounting the slotted ring to the root diameter portion of the screw. However, the slotted ring screw design has the disadvantage of having a high shear heating because of the longer metering section, the broken flight and the hydrodynamic action of the slotted ring.

The presence of the slotted rings in the just described design curtail somewhat the output capability of the deep metering sections of this screw. Without the rings, a higher output may be achieved, but the temperature of the material tends to be less and not as uniform as with the rings present. Also, with the slotted ring design, and the broken flight, there occur so-called "dead spaces" which tend to cause the thermoplastic material to back-up, especially when using polyvinylchloride as the extrudate.

It is an object of this invention to provide methods of and apparatus for obtaining an output and a mixing at least as comparable with the slotted ring screw design without increasing the shear heating of the thermoplastic materials and hence a lower temperature.

The action of the screw, in addition to carrying the material through the bore, effects a physical blending of the thermoplastic particles and a shearing type of mixing between the materials at the cylinder bore walls and screw flight edges. A thorough mixing and blending of the material is necessary to provide a homogeneous melt and to obtain a uniform extrudate. It is desirable to be able to use the material in a form having substantially the same properties of the material which is purchased and tested. In order to achieve this goal, it is desirable to avoid any change in melt index.

It is therefore an object of this invention to provide methods of and apparatus for extruding materials which provide good temperature uniformity with a minimum change in the melt index of the material.

In at least one prior art patent (see U.S. Pat. No. 3,486,193) a melt dispersing means is positioned in the root of the screw at least one screw flight upstream of the discharge end of the metering section and extending outwardly into the annular space between the screw root and the flight diameter to form alternating open and closed positions in the annular space. The dispersing means may be positioned one-half screw flight upstream of the discharge end of the first metering section and may include a plurality of cylindrical pins positioned a circumferential distance about the screw root and extending in a plane perpendicular to the screw axis out to the flight diameter of the screw, the screw flight being interrupted thereat. Alternatively, the dispersing means may include a plurality of spaced apart square pegs extending radially from the root of the screw and positioned a full flight length befor the discharge end of a first metering section and extending to within about 0.015 inch of the flight diameter.

In still another prior art patent (U.S. Pat. No. 3,487,503), an extruder for plastic material has a screw which is provided with pegs arranged crosswise of a channel between adjacent turns of one flight of the screw along a section thereof sufficiently near the discharge end of the extruder so that the material received thereby will be in a plastic condition. The row of pegs may be aligned parallel to the axis of the screw or may follow the shortest direction between flight portions defining the adjacent turns of the flight. In this latter arrangement, the rows extend perpendicular to the direction of the channel rather than parallel with the extruder axis. The pegs of each row are in staggered relation with those of the adjacent row. Moreover, the pegs are of approximately the same height as the flight in all cases. Also, although some of the pegs in a portion of the screw lie in a plane that may be perpendicular to the axis of rotation of the screw, there are other ones of the pegs in that portion which lie outside the plane and which have the axes thereof parallel to the plane. The arrangement of the pegs in such a fashion may restrict somewhat the flow of the material.

It is thus an object of this invention to provide an extruder screw having a pin arrangement which provides a less restricted passage for the materials than has been provided in the past.

Also in the prior art peg arrangements, say transverse across the channel width, the number of pegs that may be used is somewhat restricted since the distance crosswise of the channel may be less than the circumference of the screw. If it would be possible to use an arrangement of pins about the circumference of the screw, more pins could be mounted on the screw so as to achieve a finer division with less restriction resulting in finer homogenizing or a better mixing up of the material.

An object of this invention, and a feature which the prior art appears to lack, is the provision of an extruder screw having facilities for breaking up the solids in the material so that the solids are dissipated in with the melt pool formed in front of the screw flight.

The term "mixing" as commonly used in the extruding art may be regarded as an action which effects the random scattering of minute portions of the melt in the condition as discharged from the extruder. The melt may be in a thermally uniform state because mixing has been carried out to a degree that any non-uniformity of heating is readily corrected by transfer of heat from small hotter portions of the melt to the adjacent cooler portions.

The term "dispersing" involves mixing on a more microscopic level in which particles of various compounds in the melt are uniformly distributed. Dispersions may be prepared within the particles approach sizes on the order of a few molecules of thickness.

As used herein, the term "flight diameter" refers to a value equal to twice the distance from the center of the screw to a point in the edge surface of a screw flight in a plane perpendicular to the axis of the screw. The root diameter of the screw is the diameter of the shaft or shank or core about which the helical flight is formed. The flight diameter is constant so as to maintain a contact clearance in the cylindrical core with the flight depth or root character being varied to provide different degrees or blending in the extruder.

SUMMARY OF THE INVENTION

It is an object of this invention to provide methods of and apparatus for advancing and working thermoplastic materials to homogenize the materials.

It is also an object of this invention to provide methods of and apparatus for advancing an extrudate and for working the extrudate optimumly without overly restricting the flow of the material.

Another object of this invention is to provide methods of and apparatus for improving existing conventional extruder screws to achieve greater output and extrudates of improved quality with structural modifications involving minor costs.

Still another object is to improve the capacity of conventional extruder of conventional length-over-diameter (L/D) ratio to effect complete mixing of a material after reaching a plasticized state, and high thermal uniformity within the material just prior to being discharged or extruded.

A still further object of this invention is to provide methods of and apparatus for achieving greater output rates of extrudates by using extruder screws having a deeper channel between the walls of the flight of the extruder screw, especially in the metering section thereof, without increasing the barrel diameter or length.

A method of advancing and working thermoplastic materials embodying certain features of the invention may include the steps of revolving at least one channel about an axis of revolution to advance at least one thermoplastic material through the channel along a predetermined path, and subjecting the material to at least one plurality of forces exerted by force-producing components extending into the path, all of the force-producing components in any one portion of the channel having at least some portion of the axis of each of the components in the portion of the channel lying in a plane which is perpendicular to the axis of revolution, the walls of the channel being formed by surfaces, which surfaces intersect with the plane so that the walls of the channel are uninterrupted at the intersection with the plane.

An apparatus for advancing and working thermoplastic materials embodying certain features of the invention may include at least one channel generated about an axis of revolution, facilities for revolving the at least one channel about the axis of revolution to advance at least one thermoplastic material through the channel along a predetermined path, and at least one plurality of force-producing components extending into the path for subjecting the material to at least one plurality of forces, all of the force-producing components in any one portion of the channel having at least some portion of the axis of each of the components in the section lying in a plane which is perpendicular to the axis of revolution, the walls of the channel being formed by surfaces, which surfaces intersect with the plane so that the walls of the channel are uninterrupted at the intersection with the plane.

BRIEF DESCRIPTION OF THE DRAWINGS

Other objects and features of the present invention will be more readily understood from the following detailed description of specific embodiments thereof when read in conjunction with the accompanying drawings, in which.

DETAILED DESCRIPTION

Figure 1:
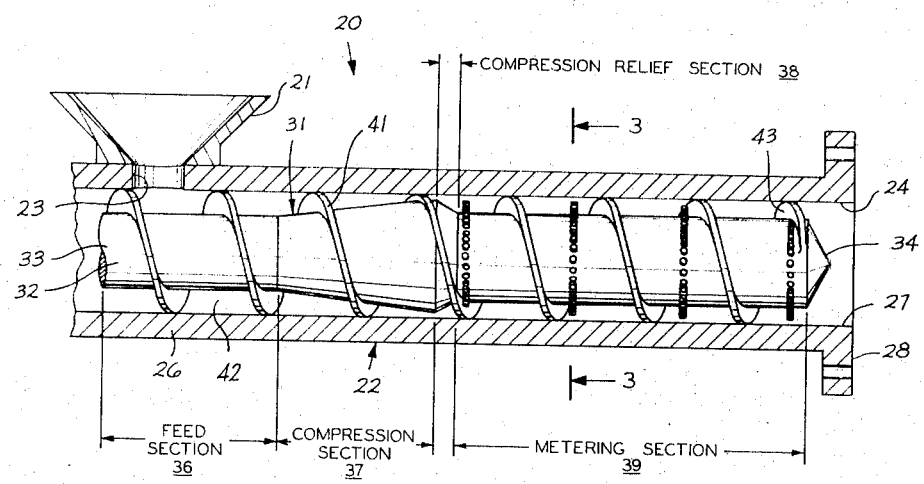
FIG. 1 is an elevation view, partially in section, of an apparatus which embodies certain principles of this invention and showing a conventional compression relief design extruder screw modified with a pin arrangement.

Referring now to FIG. 1, there is shown one type of extruder arrangement which is used commercially in the extrusion art. There is shown an extrusion apparatus, designated generally by the numeral 20, which includes a hopper 21 into which at least one thermoplastic material in the form of pellets is fed. The hopper 21 communicates with an extrusion cylinder, designated generally by the numeral 22, so that the thermoplastic materials are advanced from an inlet or receiving end 23 of the cylinder to an outlet or delivery end 24 thereof where the extrudate is formed into a covering on a cable core (not shown), successive sections of which are advanced continuously through an extruder head (not shown).

As can best be seen in FIG. 1, the extrusion cylinder 22 includes a barrel or casing 26 having an internal surface or revolution in the form of a cylinder bore 27 of uniform diameter formed therethrough and connecting the receiving end 23 to the delivery end 24. The extrusion cylinder 22 also includes a flange 28 at the delivery end 24 thereof which facilitates the attachment of adapters, dies and other auxiliary equipment (none of which are shown).

In order to advance the thermoplastic material from the hopper 21 to the delivery end 24 of the extruder 20, an extruder screw, designated generally by the numeral 31, is disposed concentrically within the bore 27. The extruder screw 31 includes a core 32, has an upstream end 33 thereof adjacent the hopper 21, and a downstream end 34 adjacent the delivery end 24. Moreover, the extruder screw 31 is of a design commonly referred to as a compression relief design. As such, and beginning at the upstream end 33 thereof, the extruder screw 31 includes, successively, a first constant root diameter section 36 of the core 32 referred to as a feed section (see FIG. 1), a uniformly increasing root diameter section 37, referred to as a compression section, a uniformly decreasing root diameter section 38, referred to as a compression relief section, and a uniform diameter root section 39, commonly referred to as the metering section.

The extrusion screw 31 is manufactured to have a thread or flight 41 formed helically about and extending longitudinally along the core 32. The flight 41 is formed to provide a groove or channel 42 formed by the root diameter surface of the core 32 and facing side walls 43—43 of the flight. The external diameter and pitches of the flight 41 are generally identical and constant along the length of the extruder screw 31 from a point just beyond the entrance end 33 of the screw to the delivery end 34 thereof. However, if desired, the pitch of the flight 41 may be made to decrease slightly from the portion of the screw adjacent the receiving end 23 of the bore 27 to the delivery end 24 thereof. The leading face of the flight 41 is substantially perpendicular to the root diameter surface of the core 32 to provide for an improved delivery action.

The channel 42 formed between the opposing walls of the flight 41 and the surface of the core 32 is generally rectangular in shape. It should be clear that the area of the channel 42 is constant from the receiving end 33 to the beginning of the compression section 37. Then the area of the channel 42 decreases to the compression relief section 38 whereat the area increases for one-half turn and then remains constant throughout the metering section 39.

Figure 2:
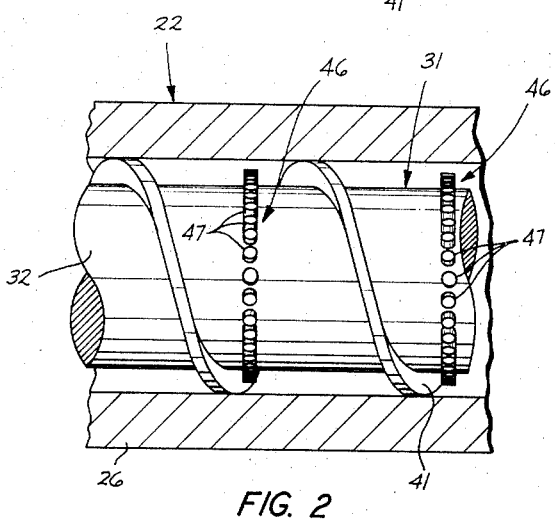
FIG. 2 is an enlarged fragmentary detail view of a portion of the extruder screw of FIG. 1 and showing one group of pins connected to a core of the screw.

In order to homogenize the thermoplastic material or materials which are being advanced through the extruder 20 with respect to say temperature or physical mix, the extruder screw 31 is provided with facilities, designated generally by the numeral 46, for subjecting the materials to a plurality of forces (see FIG. 2). As can best be seen in FIG. 2, the homogenizing facilities 46 include a plurality of force-producing components 47—47 in the form of pegs or pins which are mounted individually in holes 48—48 formed in the core 32 of the extruder screw 31. The holes 48—48 are formed so that the centers thereof lie substantially in a plane which is perpendicular to a longitudinal axis of rotation of the core 32. Additionally, the holes 48—48 are formed in the core 32 so that when the pins 47—47 are mounted in the associated ones of the holes, the pins are directed radially outward from the longitudinal axis of the core 32.

Figure 6:
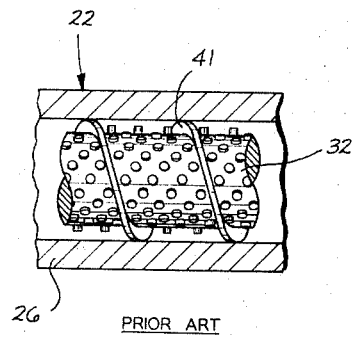
FIG. 6 is a detail view of a portion of a prior art extruder screw having a pin arrangement with the pins arranged generally crosswise of the channel formed by the flight.

It should be observed that the arrangement of pins 47—47 of this invention differs from that of prior art arrangements such as that shown in FIG. 6. For example, all of the pins 47—47 in any portion of the extruder screw 31 have at least some portion of the axes thereof or of the pins themselves lying in the so-called plane of pins which is perpendicular to the axis of rotation of the screw.

Figure 4:
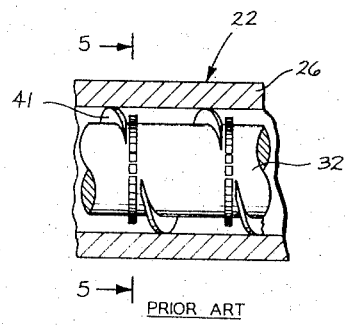
FIG. 4 is a detail view of a portion of a prior art extruder screw of a slotted ring design in which the screw flights are interrupted to permit mounting or forming of the slotted rings.
Figure 5:
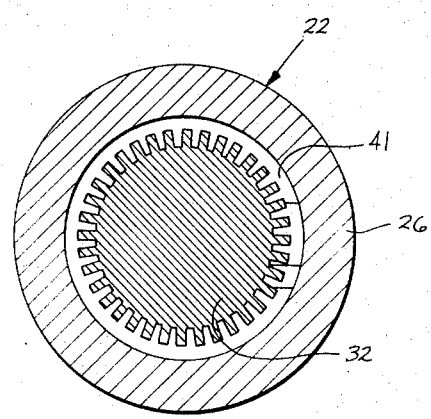
FIG. 5 is an enlarged sectional view of the slotted ring prior art screw design of FIG. 4 taken along lines 5—5 thereof.

The structural arrangement of the pins 47—47 with respect to the flight 41 is established so that the cooperation therebetween minimizes the "dead spaces" and maximizes the homogenizing actions. In order to accomplish this, the flight 41 of the extruder screw 31 is uninterrupted at least in that portion of the screw whereat the pins 47—47 are located. This overcomes some of the disadvantages of the interrupted pattern of flight typical of slotted ring design screws (see FIGS. 4 and 5).

Figure 3:
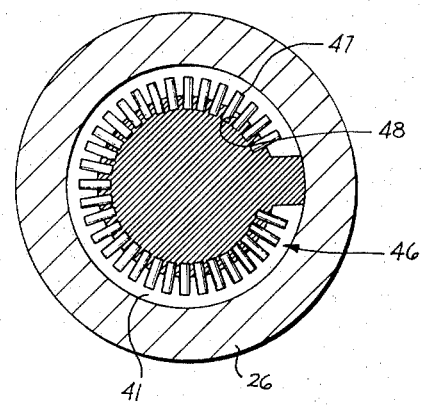
FIG. 3 is an enlarged sectional view of the extruder screw and associated barrel of FIG. 1 taken along lines 3—3 showing a plurality of pins directed outwardly radially from a longitudinal axis of the screw and lying substantially in a plane perpendicular to the axis, the flight of the screw being uninterrupted in the section of the screw containing the pins.

The walls 43—43 of the flight 41 of the screw 31 are formed by surfaces which intersect with the plane containing the pins 47—47 such that the surfaces are continuous through the plane. This feature of an uninterrupted flight 41 is shown clearly in FIGS. 2 and 3.

It has also been found that the positioning of the pin planes along the longitudinal axis of the screw 31 is important in order to optimize the homogenizing action of the pins. Most desirably the pins 47—47 are located along the metering section 39 of the extruder screw 31. The pins 47—47 are placed in the metering section 39 since the pins are more effective there with the least restriction to the pumping action of the screw. Additionally, four planes of pins 47—47 spaced evenly along the metering section 39 appear to yield the best results to date.

Of course, the number of pins 47—47, their location, diameter and spacing may vary according to a particular application of the extruder 20, the melt temperature, type of plastic shape extruded, type of materials fed to the extruder, diameter of the screw 31, and other pertinent variables. The passage of the thermoplastic material through a plane of the pins 47—47 brings about substantial mixing to achieve thermal uniformity throughout the mix. The number of groups of pins 47—47 may be increased or decreased as necessitated by the degree of responsiveness of heating and mixing.

The holes 48—48 may be drilled to a diameter requiring press fitting of the pins 47—47. The pins 47—47 may be positively anchored in the core 33 by, prior to the insertions thereof, placing solder powder and flux in the associated hole 48 and thereafter pressing the pin into the hole and applying heat to the pin and adjacent core area until bonding has taken place. As the pins 47—47 are made ordinarily oversized with respect to length, the outer end surfaces are ground, machined or otherwise trimmed to a contour conformity with the surface of revolution swept by the flight 41. Of course, the pins 47—47 can be connected to the core 32 in any feasible manner which does not otherwise disrupt the cross-sectional area of the channel 42.

In one typical arrangement, the extrusion apparatus 20 includes a screw 31 having a barrel diameter of 8 inches. The feed section 36 extends for six turns of the flight 41 and has a depth of 750 mils. The compression and compression relief sections 37 and 38, respectively, extend for 6½ turns respectively and have minimum depths of 150 mils. Finally, the metering section extends for 7½ turns and has a uniform depth of 250 mils. If the compression section 37 is too short, the materials are compressed in too short a time which results in excessive heat build-up that could burn and degrade the thermoplastic material.

Four planes of pins 47—47 are used with the upstream one of the planes being located one-half turn or one-half pitch downstream of the compression relief section 38 of the screw 31. Alternatively, the upstream one of the planes is three-sixteenths inch downstream of the compression relief section. The downstream one of the planes is positioned at the downstream end of the screw 31 with the other two planes spaced uniformly between the other two planes.

As for the pins 47—47, the pins may be cylindrical, three-sixteenths inch diameter with the centers of the holes 48—48 thereof spaced at least one-quarter inch apart on a circumferential circle about the core 32. The pins 47—47 extend into the predetermined path of the thermoplastic materials along the channel 42 with the height of the pins approximately, but not necessarily, the height of the flight 41.

Of course, all of the pins 47—47 in a portion of the metering section 39 need only have a portion thereof in the plane associated with that portion of the metering section. The pins 47—47, instead of lying substantially in the plane with the pins directed radially outward, could project transversely out of the plane where it intersects the flight 41. Or the pins 47—47 could be included in the plane but not necessarily be directed radially outward from the axis of rotation of the core 32. And finally, it is within the scope of this invention that the force-producing components 47—47 need not be in the form of pins but could be in the form of vanes such as is common in impeller wheels.

It may also be important to the operation of the extruder apparatus 20 in a particular application to have a specified ratio of the circumferential area of the core 32 of the screw 31 between the pins to the total area of the free ends of the pins 47—47 in any one plane. The extruder screw 31 which embodies the principles of this invention could have the pins 47—47 arranged so that this ratio lies in the range of 0 to 1.

OPERATION

Thermoplastic material, such as polyethylene, polymerized vinyl chloride or the like in granular, powder or pellet form with suitable fillers and/or pigments, is introduced into the hopper 21 of the extruder 20. Facilities, including a motor and gear reduction unit (not shown) are provided to turn rotatably the extrusion screw 31 to advance the thermoplastic material from left to right, as viewed in FIG. 1. The thermoplastic material is advanced through the channel 42 between the walls of the flight 41.

As the thermoplastic material is advanced into the compression section 37, compacting, softening, melting and mixing takes place therein as the cross section of the channel 42 decreases. The material in the compression section 37 tends to be drawn out with a change in velocity. Then when the material enters the compression relief section 38, the material tends to be retracted somewhat with accompanying change in velocity. The metering section 39 functions to tend to bring about uniformity throughout the material advanced therethrough with respect to the temperature, composition and coloring. The barrel 26 may be heated at selected portions thereof to increase the rate of plasticization of the material.

Thermoplastic materials generally have maximum temperatures at which they resist decomposition or other degradation. This is important so as to avoid over-heating within the extruder 20. Heat resulting from the work expended or the material processed by the extruder 20 may be sufficient to be the exclusive source of heat for effecting plasticization. Where the temperature between the melting point or melting range of material and the decomposition temperature is small, facilities (not shown) for heating or cooling portions of the barrel and screw core may be required.

The general direction of the melting material relative to the screw 30 is lengthwise of the helical channel 42. For purposes of explanation, the channel 42 may be regarded as having a helical axis extending lengthwise of the channel midway between adjacent turns of the flight 41. In addition to this movement, the material flows transversely and in a curvilinear fashion about the axis. Each minute element of material traverses a path which is a helix having convolutions centered about the axis which is also a helix. This movement is generated by the frictional engagement of the inner barrel surface 27 with the outer surface of the plastic material. Because of heat transmission at the interface of the screw flight 41 and the surface of revolution resulting from frictional heating, or by heating or cooling equipment, a temperature gradient normally exists which varies outwardly from the axis to the interface.

As the material is advanced through each of the circles or planes of pins 47—47, the pins, depending upon the height thereof, penetrate corresponding heights of the material contained in the channel 42 to disrupt the normal cross section currents of the material and cause mixing of the material. By using the pins 47—47 in the manner described, a high degree of thermal uniformity of the extrudate is obtained. The pins 47—47 tend to overcome the tendency of the melt to migrate upstream to the leading or pushing face of the flight 41. By using the pins 47—47, the melt is urged toward the trailing faces of the flight to mix the melt with the solids and achieve a homogeneous extrudate.

Figure 7:
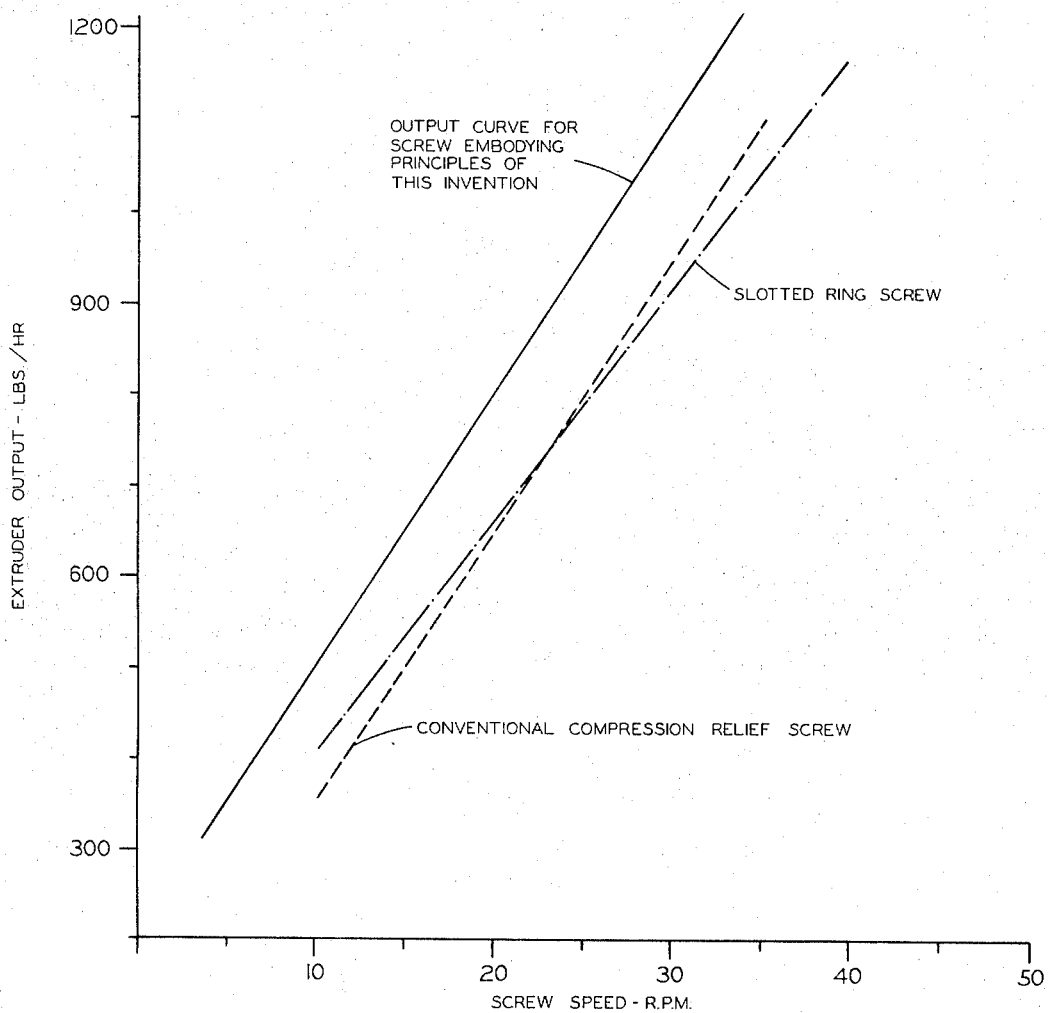
FIG. 7 is a graph showing extruder screw output for compression relief, slotted ring screw designs and the screw design which embodies the principles of this invention.

It should be observed that in the past, achievement of thermal uniformity of an acceptable degree was obtained principally through a reduction of the depth of the channel 42 within the metering section 39. This of course had the unfortunate corollary effect of reducing the delivery capability of the extruder 20. In FIG. 7 are shown output curves for extruder screws of typical compression relief and slotted ring designs.

The present invention avoids a reduction in delivery capability that would otherwise be necessary to homogenize the material. Rather than thin out the flow path of the melt stream to a low-capacity output, the extruder 20 which embodies the principles of the present invention divides the melt stream into a number of smaller streams thereupon exposing the molten material to high shear rates for a short period of time after which the small streams of material are merged again in a mixed condition. As shown by the solid curve in FIG. 7, the screw 31 which embodies the principles of this invention utilizes a deeper metering section 39 to obtain high output capability while at the same time having good mixing to obtain thermal uniformity and overcome the tendency for the melt to drift upstream.

It should be realized that an additional benefit of this invention accrues in that presently used screws may be easily modified to include the pins 47—47. This permits the continued use of present investment in plant and at the same time being able to increase the output of the present invention.

In one typical arrangement, in an 8-inch, 20/1 extruder for low-density polyethylene, the barrel temperature is maintained at 400°F, and the melt temperature at 450°F. The speed of the extruder screw 32, which includes the pins 47—47, is 46 revolutions per minute to given an output of 1,400 pounds per hour.

In another typical arrangement, in a 10-inch, 8 ½ / 1 extruder, the length of the feed section 36 is 27.9 inches, of the compression section, 19.5 inches, of the relief section 5.0 inches, and the metering section 30.0 inches. The depth of the feed channel is 0.75 inches, of the metering section 1.210 inches with a screw lead of 6.5 inches. This design screw with the pin arrangement gives an output of 1,100 lbs. per hour at 43 revolutions per minute.

It is to be understood that the above-described arrangements are simply illustrative of the invention.

Other arrangements may be devised by those skilled in the art which will embody the principles of the invention and fall within the spirit and scope thereof.

What is claimed is:

1. A method of advancing and working thermoplastic materials, which includes the steps of:
   revolving at least one channel about an axis of revolution to advance at least one thermoplastic material through the channel along a predetermined path; and
   subjecting the material to at least one plurality of forces exerted by force-producing components extending into the path and along axes which intersect the channel:
   all of the force-producing components in any one portion of the channel having at least some portion of the axis of each of the components in the portion lying in a plane which is perpendicular to the axis of revolution;
   any portion of the channel extending between the walls of the channel and a predetermined distance along the axis of revolution;
   the walls of the channel being formed by continuous surfaces intersecting with the plane so that the walls of the channel are uninterrupted at the intersection with the plane.

2. The method of claim 1, wherein the channel is formed by a helical flight generated about the axis of revolution.

3. The method of claim 1, wherein the axes of all the force-producing elements in any one portion of the channel lie substantially in the plane.

4. A method of advancing and working thermoplastic materials, which includes the steps of:
   revolving at least one channel about an axis of revolution to advance at least one thermoplastic material through the channel along a predetermined path;
   the walls of the channel being formed by turns of a flight formed about and along the axis of revolution; and
   subjecting the material to at least one plurality of forces exerted by force-producing components extending into the path;
   all of the force-producing components in the channel in any one turn of the flight having at least some portion of each of the components in the turn lying in a plane which is perpendicular to the axis of revolution;
   the walls of the channel being formed by continuous surfaces, intersecting the plane so that the channel is uninterrupted at the intersection with the plane.

5. A method of advancing and working thermoplastic materials, which includes the steps of:
   rotating an extruder screw having at least one helical flight formed thereon about an axis of rotation to advance at least one thermoplastic material through a channel having walls formed by the flight; and
   subjecting the material to at least one plurality of forces exerted by force-producing components extending into the channel and along axes which intersect the channel; all the force-producing components in the channel in any one turn of the flight having at least some portion of the axis of each of the components in the turn lying in a plane which is perpendicular to the axis rotation;
   the at least one flight intersecting with the plane and being continuous therethrough.

6. The method of claim 5, wherein at least some portion of each one of all of the force-producing components in any one turn of the flight lies in the plane.

7. The method of claim 6, wherein all of the force-producing components in any one turn of the flight lie substantially in the plane.

8. A method of advancing and working thermoplastic materials, which comprises the steps of:
   advancing at least one thermoplastic material through a helical channel extending along and about an axis of revolution;
   compressing the material;
   relieving the pressure in the material; and
   homogenizing the material by subjecting the material to at least one plurality of forces subsequent to relieving the pressure in the material, the forces being exerted by force-producing components, all the force-producing components in the channel in any one turn thereof lying substantially in a plane which is perpendicular to the axis of revolution and directed radially outward from the axis of revolution;
   the helical channel having uninterrupted side boundaries at least along that portion of the predetermined path at which the force-producing components are positioned.

9. A method of advancing and working thermoplastic materials, which comprises the steps of:
   moving a core having at least one helical flight formed therealong rotatably about an axis of rotation to advance a thermoplastic material along a predetermined path;
   compressing the material;
   relieving the pressure in the material; and
   subjecting the material to at least one plurality of forces subsequent to relieving the pressure in the material, the forces being exerted by force-producing components;
   all of the force-producing components along the core in any one turn of the flight having at least some portion thereof lying in a plane which is perpendicular to the axis of rotation;
   the flight intersecting with and being continuous through the plane.

10. The method of claim 9, wherein each one of the force-producing components in any one turn of the flight lies substantially in the plane.

11. The method of claim 10, wherein force-producing components are directed radially outward from the axis of rotation.

12. A method of advancing and working thermoplastic materials, which comprises the steps of:
   introducing at least one thermoplastic material into engagement with a first zone of a screw mounted rotatably in a housing, the screw having a helical flight formed thereon;
   moving the screw rotatably about an axis of rotation to feed the thermoplastic materials longitudinally along the screw through a channel formed on the screw to a second zone of the screw;
   compressing the thermoplastic material in the second zone of the screw while the material is advanced simultaneously through the second zone to a third zone;

relieving the pressure in the thermoplastic material in a third zone of the screw while the material is advanced through the third zone to a fourth zone; and advancing the thermoplastic material through a fourth metering zone of the screw while simultaneously homogenizing the material by subjecting the material to at least one group of a plurality of forces exerted by force-producing components spaced about the surface of the screw and extending into the channel, all of the force-producing components creating the forces being in a metering zone of the screw and all of the force-producing components along the metering zone of the screw in any one turn of the flight lying in a plane perpendicular of the axis of rotation of the screw, being directed radially outward from the axis of rotation, and being non-intersecting with the flight.

13. An apparatus for advancing and working thermoplastic materials, which comprises:
at least one channel having a base and side walls, the channel being generated about an axis of revolution;
means for revolving the at least one channel about the axis of revolution to advance at least one thermoplastic material through the channel along a predetermined path; and
at least one plurality of force-producing components extending into the path and along axes which intersect the base of the channel for subjecting the material to at least one plurality of forces;
all of the force-producing components in the channel in any one turn thereof having at least some portion of the axis of each of the components in the section lying in a plane which is perpendicular to the axis of revolution;
the walls of the channel being formed by surfaces intersecting with the plane so that the channel walls are uninterrupted at the intersection with and are continuous through the plane.

14. An apparatus for advancing and working thermoplastic materials, which comprises:
at least one channel having a base and side walls, the channel being generated about an axis of revolution;
means for revolving the at least one channel about the axis of revolution to advance at least one thermoplastic material through the channel along a predetermined path; and
at least one plurality of force-producing components extending into the path for subjecting the material to at least one plurality of forces;
all of the force-producing components in the channel in any one turn thereof having at least some portion of each of the components in the turn lying in a plane which is perpendicular to the axis of revolution;
the walls of the channel being formed by surfaces intersecting with the plane so that the channel walls are uninterrupted at the intersection with and are continuous through the plane.

15. The apparatus of claim 14, wherein the channel is formed by a helical flight generated about the axis of revolution.

16. Apparatus for advancing and working thermoplastic materials, which comprises:

a channel generated helically about an axis for advancing at least one thermoplastic material along a predetermined path;
means for revolving the channel about the axis; and
at least one plurality of force-producing components extending into the path along axes which intersect the channel and positioned along the axis of revolution for subjecting the material to a plurality of forces,
all of the force-producing components in the channel in any one turn thereof having at least a portion of the axis thereof lying in a plane which is perpendicular to the axis of revolution;
the walls of the channel being formed by surfaces, which surfaces intersect with the plane and which surfaces are continuous through the plane.

17. Apparatus for advancing and working thermoplastic materials, which comprises;
a housing having a longitudinally extending bore formed therein and having a longitudinal axis;
means disposed concentrically within the bore and having a flight formed helically thereon and extending substantially from one end thereof to the other for advancing a thermoplastic material from the one end to the other end thereof;
means for rotating the advancing means about the longitudinal axis; and
a plurality of means connected to the advancing means for homogenizing the thermoplastic material, all of the homogenizing means in any one turn of the flight being disposed substantially in one plane perpendicular to the longitudinal axis;
the helical flight being continuous in at least the portion of the advancing means which contains the homogenizing means.

18. Apparatus for advancing and working thermoplastic materials, which comprises:
means including at least one channel for advancing at least one thermoplastic material along a predetermined path through the channel extending along the predetermined path; and
means for revolving the channel around an axis of revolution; and
a plurality of means in the advancing means and directed radially outward from the axis of revolution for homogenizing the material; all the means in any one turn of the channel lying substantially in a plane which is perpendicular to the axis of revolution;
the walls of the channel being formed by surfaces, which surfaces intersect with the plane and are continuous therethrough so as to have uninterrupted boundaries at least along that portion of the predetermined path containing the homogenizing means.

19. Apparatus for advancing and working thermoplastic materials, which comprises:
a housing having a longitudinally extending cylindrical bore formed therein,
an extrusion screw fitting closely within the bore and having a channel extending substantially from one end to the other end thereof generated helically about an axis of rotation of the screw, one end of the screw being a receiving end and the other end being a delivery end, for advancing a thermoplastic material from the receiving end of the screw to the delivery end thereof and for homogenizing the material;

the screw being formed successively from the receiving end to the delivery end with a feed section, a compression section, a compression relief section, and a metering section, and a plurality of means in the channel for subjecting the thermoplastic materials to a plurality of forces; all the means in any one turn of the channel having at least an integral portion thereof disposed in one plane which is perpendicular to the axis of rotation of the screw;

the walls of the channel being formed by surfaces intersecting with the plane so that the surfaces are uninterrupted and continuous through the plane.

20. The apparatus of claim 19, wherein the subjecting means is disposed within the metering section of the screw.

21. The apparatus of claim 19, wherein the subjecting means includes at least one group of a plurality of force-producing components with all of the force-producing components in any one turn of the channel having at least a portion of each of the force-producing components in that turn lying in the plane.

22. The apparatus of claim 21, wherein all the force-producing components are positioned along the metering section of the screw, all of the force-producing components in any one turn of the metering section of the screw lying substantially in the plane.

23. The apparatus of claim 22, wherein the upstream one of the at least one group of components is spaced less than one turn downstream of the compression relief section of the screw.

24. The apparatus of claim 23, wherein a second group of force-producing components are positioned at the downstream end of the screw.

25. The apparatus of claim 24, wherein at least four groups of the force-producing components are spaced along the metering section of the screw, the middle two groups of components being equally spaced along the metering section between the upstream-most group and the downstream-most group.

26. The apparatus of claim 19, wherein the subjecting means includes one group of a plurality of pins arranged about the circumference of the screw, all of the pins in the at least one group lying substantially in the plane all of the pins being within the metering section of the screw.

27. The apparatus of claim 26, wherein the pins are directed radially perpendicularly of the axis of rotation of the screw.

28. The apparatus of claim 27, wherein the upstream one of the planes is spaced one-half the pitch of the screw downstream of the downstream end of the compression relief section of the screw.

29. A screw for advancing and working thermoplastic materials, which comprises:

a core having an axis of rotation for advancing a thermoplastic material;

at least one flight connected to and extending outwardly from the core to a surface of revolution concentric with the axis of rotation of the core, the flight being generated helically about the axis of rotation; and at least one plurality of force-producing components connected to the core for subjecting the material to a plurality of forces, the force-producing components extending beyond the core along axes which intersect the core and spaced from the surface of revolution, all of the force-producing components along the core in any one turn of the flight having at least some portion of the axis of each of the components in the turn of the flight lying in a plane which plane is perpendicular to the axis of rotation;

the flight intersecting with and being continuous through the plane.

30. A screw for advancing and working thermoplastic materials, which comprises:

a core having an axis of rotation for advancing a thermoplastic material;

at least one flight connected to and extending outwardly from the core to a surface of revolution concentric with the axis of rotation of the core, the flight being generated helically about the axis of rotation; and at least one plurality of force-producing components connected to the core for subjecting the material to a plurality of forces, the force-producing components extending beyond the core and spaced from the surface of revolution, all of the force-producing components along the core in any one turn of the flight having at least some portion of each of the components in the turn of the flight lying in a plane which plane is perpendicular to the axis of rotation;

the flight intersecting with and being continuous through the plane.

31. A screw for advancing and working thermoplastic materials, which comprises:

a core having an axis of rotation;

at least one helical flight extending outwardly from the core to a surface of revolution concentric with the axis of rotation of the core, the at least one flight defining a channel measured in a transverse direction between adjacent turns of the flight, and extending in a helical path lengthwise of the core; and a plurality of means for subjecting a thermoplastic material to a plurality of forces to homogenize the material; all the means in any one turn of the flight disposed substantially in one plane which is perpendicular to the axis of rotation of the core;

the helical flight being continuous at least in that portion of the screw in which the subjecting means is positioned.

32. The screw for advancing and working thermoplastic materials as set forth in claim 31, wherein:

the core is formed with at least a metering section, and the subjecting means is disposed in at least one plane positioned along the metering section.

33. An extruder screw for advancing and working thermoplastic materials, which comprises:

a core having an axis of rotation;

a helical flight extending outwardly from the core to a surface of revolution concentric with the axis of rotation of the core, the flight defining a channel measured in a transverse direction between adjacent turns of the flight and extending in a longitudinal direction in a helical path lengthwise of the screw;

the screw being formed with at least a feed section, a compression section, a compression relief section and a metering section, and at least one plurality of pins extending radially outwardly from the core towards the surface of revolution, all of the pins in any one turn of the flight being arranged substantially in a plane, the plane being perpendicular to the axis of rotation of the core, the helical flight being continuous in at least that section of the screw containing the pins.

34. The extruder screw of claim 33, wherein the pins are located in the metering section of the screw.

35. The extruder screw of claim 34, wherein the plane in which the pins are disposed is located one-half turn downstream of the compression relief section.

36. The extruder screw of claim 34, wherein the pins are arranged in four planes spaced evenly along the metering section of the screw, the first one of the planes being one-half turn downstream of the compression relief section and the downstream one of the planes being at the downstream end of the screw.

37. The extruder screw of claim 34, wherein the height of the pins is less than that of the flight.

38. The extruder screw of claim 34, wherein the height of the pins is the same as that of the flight.

39. The screw of claim 34, wherein the upstream one of the planes is positioned approximately three-sixteenths inch downstream of the compression relief section.

40. The screw of claim 34, wherein the pins are three-sixteenths inch in diameter and the axes of the pins are spaced at least one-quarter inch apart along an axis circumferentially of the core.

41. The screw of claim 34, wherein the ratio of the area of the root surface between projections to the area of the outwardly exposed surfaces of the pins in any one portion of the core is between 0 and 1.

* * * * *